(12) United States Patent
Moon et al.

(10) Patent No.: US 9,304,375 B2
(45) Date of Patent: Apr. 5, 2016

(54) ELECTRONIC DEVICE CARRYING CASE AND PORTABLE ELECTRONIC DEVICE

(71) Applicant: Samsung Electronics Co., Ltd., Suwon-si, Gyeonggi-do (KR)

(72) Inventors: Woo Jung Moon, Seoul (KR); Joo Hyung Kim, Seoul (KR); Woo Hyeok Jeong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/755,009

(22) Filed: Jun. 30, 2015

(65) Prior Publication Data
US 2015/0378245 A1    Dec. 31, 2015

(30) Foreign Application Priority Data
Jun. 30, 2014  (KR) .................. 10-2014-0080542

(51) Int. Cl.
*G03B 17/56* (2006.01)
*A45F 5/00* (2006.01)

(52) U.S. Cl.
CPC .............. *G03B 17/561* (2013.01); *A45F 5/00* (2013.01)

(58) Field of Classification Search
CPC .... G03B 17/561; G03B 17/56; G03B 17/568; A45F 5/00
See application file for complete search history.

(56) References Cited

U.S. PATENT DOCUMENTS

| 7,265,789 | B2 | 9/2007 | Takada |
| 7,614,805 | B2* | 11/2009 | Showalter ............. F41G 11/004 |
| | | | 396/428 |
| 7,719,610 | B2 | 5/2010 | Kung et al. |
| 7,927,026 | B2 | 4/2011 | Zhang |
| 8,585,302 | B2* | 11/2013 | Totani ..................... B60R 11/04 |
| | | | 348/148 |
| 8,964,405 | B2 | 2/2015 | La Porte et al. |
| 2004/0027458 | A1 | 2/2004 | Takada |
| 2008/0079848 | A1 | 4/2008 | Kung et al. |
| 2009/0194441 | A1 | 8/2009 | Mason et al. |
| 2010/0158511 | A1 | 6/2010 | Zhang |
| 2012/0113277 | A1* | 5/2012 | Hayakawa ............. F16M 11/10 |
| | | | 348/207.99 |
| 2013/0063922 | A1 | 3/2013 | La Porte et al. |
| 2013/0223827 | A1 | 8/2013 | Enomoto et al. |
| 2013/0223828 | A1 | 8/2013 | Enomoto |
| 2013/0236166 | A1 | 9/2013 | Enomoto et al. |
| 2014/0099093 | A1* | 4/2014 | Johnson, Sr. ......... G03B 17/561 |
| | | | 396/428 |

FOREIGN PATENT DOCUMENTS

JP    2002-176579 A    6/2002

* cited by examiner

*Primary Examiner* — W B Perkey
(74) *Attorney, Agent, or Firm* — Jefferson IP Law, LLP

(57) ABSTRACT

An electronic device carrying case is provided. The electronic device includes a case part having an inside recessed to form a hollow opened to one side and an outer peripheral surface formed with a curved surface, and a mount part having an upper part provided to be detachable from a lower end of the case part and a lower part with an inwardly recessed curved surface.

20 Claims, 9 Drawing Sheets

ELECTRONIC DEVICE CARRYING CASE AND PORTABLE ELECTRONIC DEVICE

CROSS-REFERENCE TO RELATED APPLICATION(S)

This application claims the benefit under 35 U.S.C. §119 (a) of a Korean patent application filed on Jun. 30, 2014 in the Korean Intellectual Property Office and assigned Serial number 10-2014-0080542, the entire disclosure of which is hereby incorporated by reference.

TECHNICAL FIELD

The present disclosure relates to an electronic device carrying case and a portable electronic device.

BACKGROUND

In the related art, a tripod is used for mounting an electronic device, such as a camera, during the capturing of an image. When capturing an image using a tripod, a camera is attached to the top of the tripod and the tripod is stood on the ground with its legs spread. After capturing the image, the camera is detached from the tripod and the tripod is put into a pouch or a case for carrying. As an alternative, the camera may remain mounted to the tripod to save the time of mounting and dismounting the camera for each picture.

However, when a camera is carried while mounted to a tripod, it may be exposed to the outside and may be damaged.

Moreover, it is possible to carry a camera separately from a tripod but since the tripod has no space for receiving the camera, the tripod and the camera are necessary to be put into additional cases for carrying and in this case, each time a user wants to capture an image, it is inconvenient to remove the tripod from the case.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device carrying case for receiving a camera therein.

Another aspect of the present disclosure is to provide an electronic device carrying case for freely setting a direction that an electronic device such as a camera faces by separating a mount with an electronic device attached thereto from a case and attaching the mount to a case with a curved surface.

Another aspect of the present disclosure is to provide a portable electronic device capable of turning on the power when a mount with an electronic device mounted thereon is separated from a case.

Another aspect of the present disclosure is to provide an electronic device carrying case including an extra battery in addition to a battery included in an electronic device.

In accordance with an aspect of the present disclosure, an electronic device carrying case is provided. The electronic device includes a case part having an internal recess that forms a hollow opened to one side and a curved external peripheral surface, and a mount part having an upper part provided to be detachable from a lower end of the case part and a lower part with an inwardly recessed curved surface.

In accordance with another aspect of the present disclosure, a portable electronic device is provided. The portable device includes an electronic device having a camera function, and an electronic device carrying case including a case part having an internal recess that forms a hollow opened to one side to allow the electronic device to be inserted and a mount part having one side configured to be detachable from the case part and including the electronic device mounted on a top surface.

In accordance with another aspect of the present disclosure, a portable electronic device is provided. The portable device includes a mount part configured to couple with an electronic device having a camera function, a case part detachably coupled to the mount part, and a switch at the case part and the mount part to allow a state of the electronic device to be changed or to allow the camera function to be activated or deactivated according to a coupling state of the case part and the mount part.

In accordance with another aspect of the present disclosure, a portable electronic device is provided. The portable device includes an electronic device having a camera function and an electronic battery mounted therein, a mount part having the electronic device mounted thereon, and a case part including a first connection part exposed to the outside to supply a case battery provided therein and detachably coupled to the mount part.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
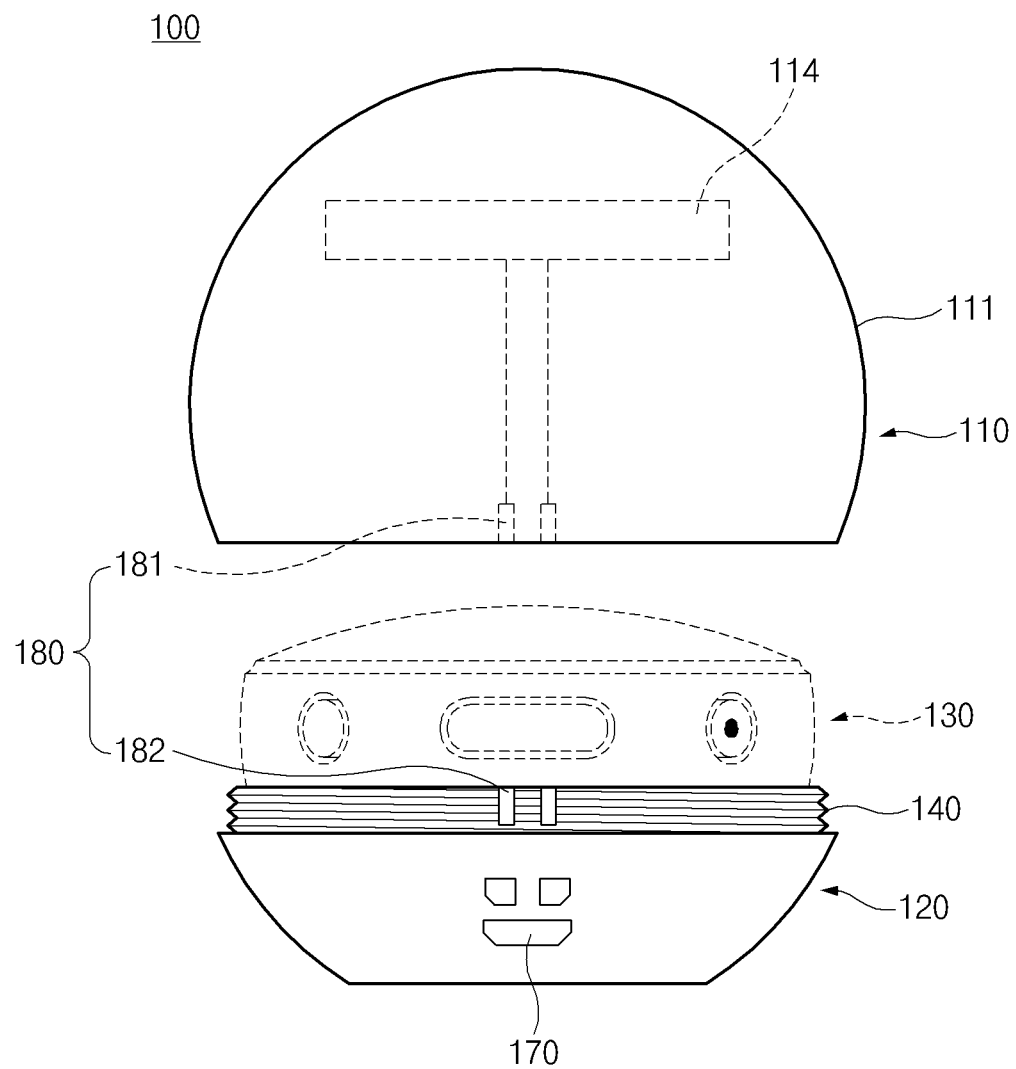
FIG. 1 is a front view of an electronic device case according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications, of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "include," "comprise," and "have", or "may include," or "may comprise" and "may have" used herein indicate disclosed functions, operations, or existence of elements but do not exclude other functions, operations or elements. Additionally, in various embodiments of the present disclosure, the terms "include," "comprise," "including," or "comprising," specify a property, a region, a fixed number, an operation, a process, an element and/or a component but do not exclude other properties, regions, fixed numbers, operations, processes, elements and/or components.

In various embodiments of the present disclosure, the expressions "A or B" or "at least one of A or/and B" may include all possible combinations of items listed together. For instance, the expressions "A or B", or "at least one of A or/and B" may include A, B, or both A and B.

The terms such as "$1^{st}$", "$2^{nd}$", "first", "second", and the like used herein may refer to modifying various different elements of various embodiments of the present disclosure, but do not limit the elements. For instance, such expressions do not limit the order and/or importance of corresponding components. The expressions may be used to distinguish one element from another element. For instance, both "a first user device" and "a second user device" indicate a user device but indicate different user devices from each other. For example, a first component may be referred to as a second component and vice versa without departing from the scope of the present disclosure.

In this disclosure below, when one part (or element, device, etc.) is referred to as being "connected" to another part (or element, device, etc.), it should be understood that the former can be "directly connected" to the latter, or "connected" to the latter via an intervening part (or element, device, etc.). In contrast, when an element is referred to as being "directly connected" or "directly coupled" to another element, there are no intervening elements present.

In various embodiments of the present disclosure, terms used in this specification are used to describe specific embodiments, and are not intended to limit the scope of the present disclosure.

Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure may be a device with a camera function. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia player (PMPs), Moving Picture Experts Group Audio Layer 3 (MP3) players, mobile medical devices, cameras, and wearable devices (for example, head-mounted-devices (HMDs) such as electronic glasses, electronic apparel, electronic bracelets, electronic necklaces, electronic appcessories, electronic tattoos, and smart watches).

According to various embodiments of the present disclosure, an electronic device may be smart home appliances having a camera function. The smart home appliances may include at least one of, for example, televisions (TVs), digital video disc (DVD) players, audios, refrigerators, air conditioners, cleaners, ovens, microwave ovens, washing machines, air cleaners, set-top boxes, TV boxes (for example, Samsung HomeSync™, Apple TV™ or Google TV™), game consoles, electronic dictionaries, electronic keys, camcorders, and electronic picture frames.

According to various embodiments of the present disclosure, an electronic device may include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head modules, industrial or household robots, financial institutions' automatic teller machines (ATMs), and stores' points of sale (POS).

According to various embodiments of the present disclosure, an electronic device may include at least one of furniture or buildings/structures having a camera function, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to various embodiments of the present disclosure may be a flexible device. Furthermore, it is apparent to those skilled in the art that an electronic device according to various embodiments of the present disclosure is not limited to the above-mentioned devices.

First, an electronic device carrying case will be described according to an embodiment of the present disclosure.

FIG. 1 is a front view of an electronic device case according to various embodiments of the present disclosure.

Figure 2:
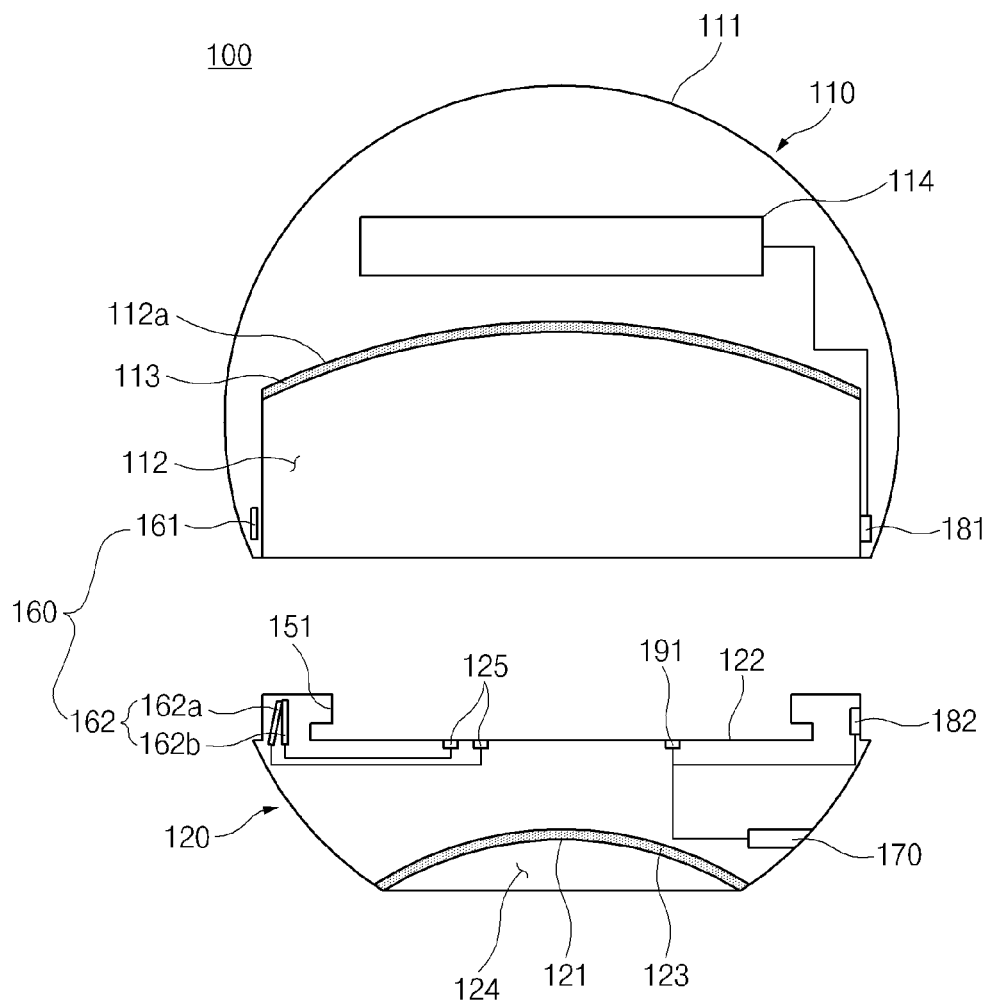
FIG. 2 is a sectional view when a case part is separated from a mount part according to various embodiments of the present disclosure.

FIG. 2 is a sectional view when a case part is separated from a mount part according to various embodiments of the present disclosure.

Referring to FIGS. 1 and 2, an electronic device carrying case 100 may include a case part 110 having an inside recessed to form a hollow 112 opened to one side and an outer peripheral surface 111 formed with a curved surface, and a mount part 120 having an upper part provided to be detachable from a lower end of the case part 110 and a lower part with an inwardly recessed curved surface 121 to form a hollow 124.

According to an embodiment of the present disclosure, the outer peripheral surface 111 of the case part 110 may be formed with a curved surface. When it is described that the outer peripheral surface 111 of the case part 110 is formed with a curved surface, it means that the outline of a cross section of the case part 110 is formed having a curved line such as a circle or an ellipse. This embodiment corresponds to the case that the cross sectional form of the case part 110 is an entire or partial form of a circuit or an ellipse.

According to an embodiment of the present disclosure, the case part 110 may have a partial form of a sphere. For example, the cross section of the case part 110 may have a partial form of a circle larger than a semi-circle. Alternatively, the cross section of the case part 110 may be in a partial form of a circle smaller than a semi-circle.

According to an embodiment of the present disclosure, the hollow 112 may be formed in the case part 110 and may have a space into which an electronic device 130 is inserted. For example, when the mount part 120 with the electronic device 130 mounted thereon is coupled to the case part 110, the hollow 112 formed inside the case part 110 may be formed to allow the electronic device 130 to be inserted thereto. In an embodiment, the electronic device 130 may be completely inserted into the hollow 112.

According to an embodiment of the present disclosure, a protective layer 113 formed of a soft material may be formed at an inner peripheral surface 112a of the case part 110. For example, when the mount part 120 with the electronic device 130 mounted thereon is coupled to the case part 110 and is received inside the case part 110, the protective layer 113 formed of, for example, cotton flannel or other soft material with a smooth surface may be formed inside the case part 110 to prevent damage such as scratching of a top surface of the electronic device 130.

According to an embodiment of the present disclosure, the lower end of the mount part 120 may be inwardly recessed to form the curved surface 121.

A curvature of the curved surface formed at the lower end of the mount part 120 may be formed to be greater than or equal to a curvature of the outer peripheral surface 111 of the case part 110.

In this case, when the mount part 120 is separated from the case part 110 and contacts the outer peripheral surface 111 of the case part 110, the adhesive degree between the curved surface formed at the mount part 120 and the outer peripheral surface 111 of the case part 110 may be improved.

At this point, when being attached to the outer peripheral surface 111 of the case part 110, the mount part 120 may further include a slide prevention part 123 at the recessed curved surface 121 to reduce or prevent sliding. For example, the slide prevention part 123 may be formed of a material such as rubber and various embodiments in addition to rubber are possible to reduce or prevent sliding.

Additionally, the electronic device carrying case 100 according to an embodiment of the present disclosure may further include a magnetic part at the case part 110 and the mount part 120 to form a magnetic force therebetween.

The magnetic part may be formed of various materials as long as a magnetic force is formed at the case part 110 and the mount part 120 so that when the case part 110 and the mount part 120 are close to each other, the mount part 120 is disposed to contact the case part 110.

A magnet may be disposed at the inside of the case part 110 and the inside of the mount part 120, or a magnet may be disposed at one of the case part 110 and the mount part 120 and a metal such as iron may be disposed at the other one.

Moreover, while the entire case part 110 and the mount part 120 may be formed of a magnetic material, the case part 110 and the mount part 120 may each include a magnetic part or a magnetic material (not shown) smaller than the case part 110 and the mount part 120 that is inserted into the inside thereof so that a magnetic force may be applied to the case part 110 and the mount part 120.

Since the entire case part 110 and mount part 120 are formed of a magnetic material in the drawings according to an embodiment of the present disclosure, an additional reference number is not assigned to the magnetic material.

According to an embodiment of the present disclosure, the mount part 120 may be detachably disposed at the case part 110.

For example, screw threads may be formed at the lower part of the case part 110 and the upper part of the mount part 120 so that a screw coupling 140 between the case part 110 and the mount part 120 may be provided.

According to various embodiments of the present disclosure, the case part 110 and the mount part 120 may further include a switch 160 therein, of which a contact state is changed according to a coupling state between the case part 110 and the mount part 120.

For example, the switch 160 may include a magnet switch and may include a first switch 161 formed of an magnetic material inside the case part 110 and a second switch 162 by which, while the mount part 120 is coupled to the case part 110, a first connection part 162a and a second connection part 162b are spaced and disconnected due to a magnetic force between the first switch 161 and the first connection part 162a, which may be connected to ground. When the mount part 120 is separated from the case part 110, the first connection part 161a and the second connection part 161b contact each other. Further, the first connection part 161a and the second connection part 161b may be respectively connected to contacts 125, which in turn may provide for an electrical connection external to the mount part 120, for example to electrical contacts of the electronic device 130.

According to various embodiments of the present disclosure, the mount part 120 may further include a first connection part 170 such as a universal serial bus (USB) interface for receiving power through an external power supply device (not shown). In turn, the power received from an external power supply through the first connection part 170 may be used for charging a battery, or otherwise providing power.

According to various embodiments of the present disclosure, the case part 110 may further include a case battery 114 therein to be used for backup power.

Additionally, according to various embodiments of the present disclosure, the electronic device carrying case 100 may further include a second connection part 180 including a first terminal 181 formed at the case part 110 and connected to the case battery 114 and a second terminal 182 formed at the mount part 120 and connected to the first connection part 170.

At the second connection part 180, when the mount part 120 is coupled to the case part 110, the second terminal 182 may be disposed at the position corresponding to the first terminal 181 when coupling of the case part 110 and the mount part 120 is completed in order to allow the first terminal 181 and the second terminal 182 to be connected.

At the second connection part 180, the first terminal 181 may be connected to the case battery 114 through a charging line and the second terminal 182 may be connected to the first connection part 170 through a charging line.

Therefore, when the mount part 120 is coupled to the case part 110, the case battery 114 and the first connection part 170 may be connected to each other through the second connection part 180 and when an external supply device is connected to the first connection part 170, the case battery 114 may be charged by receiving power from the external supply device.

According to various embodiments of the present disclosure, the electronic device carrying case 100 may be connected to at least one of the second switch 162, the first connection part 170, and the second connection part 180 and may further include a third connection part 190 including a third terminal 191 disposed at a top surface 122 of the mount part 120.

Hereinafter, a portable electronic device in which the electronic device 130 is coupled to the electronic device carrying case 100 will be described according to an embodiment of the present disclosure. Contents that overlap the contents described above will be omitted.

Figure 3:
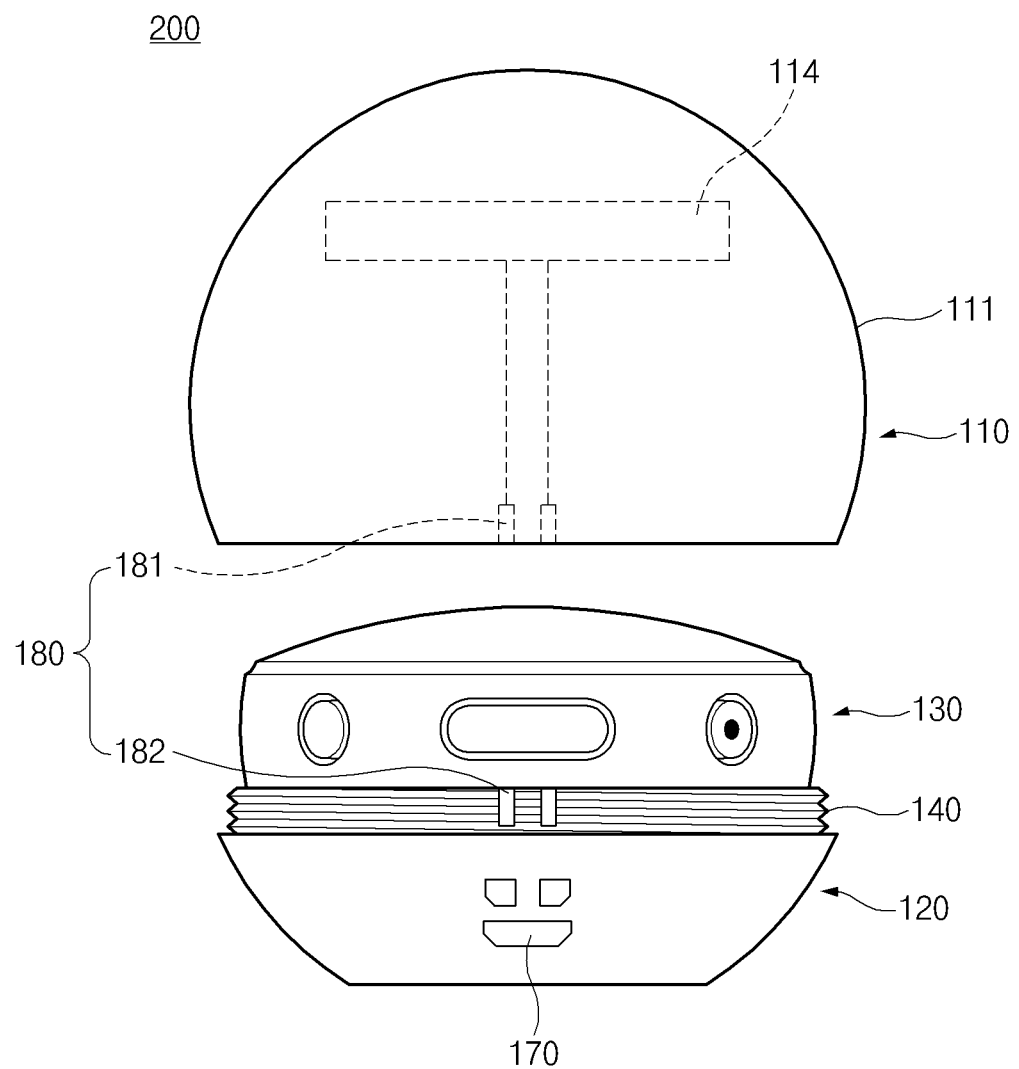
FIG. 3 is a front view when a case part is separated from a mount part according to various embodiments of the present disclosure.

FIG. 3 is a front view when a case part is separated from a mount part according to various embodiments of the present disclosure.

Figure 4:
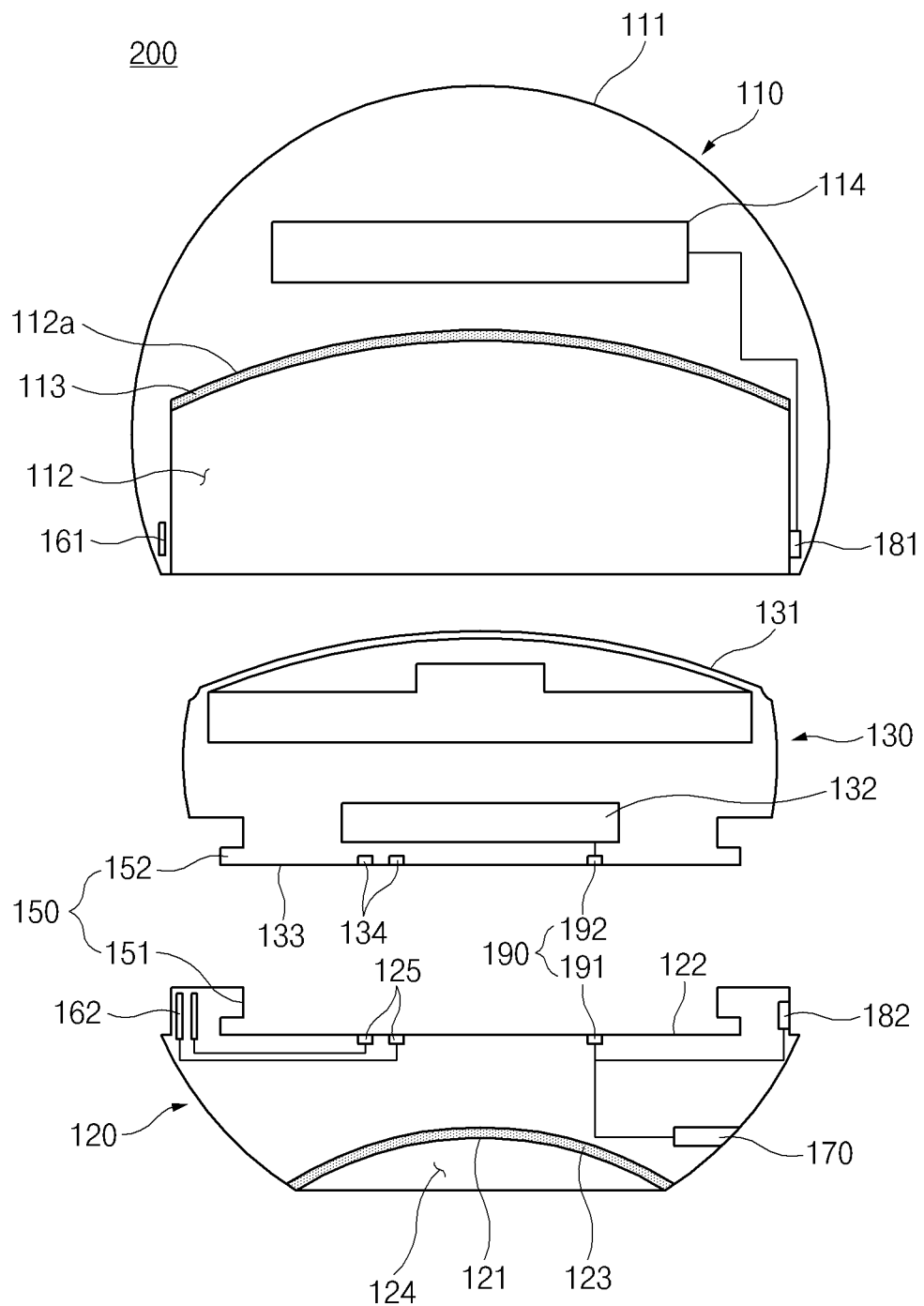
FIG. 4 is an exploded sectional view of an electronic device according to various embodiments of the present disclosure.

FIG. 4 is an exploded sectional view of an electronic device according to various embodiments of the present disclosure.

Figure 5:
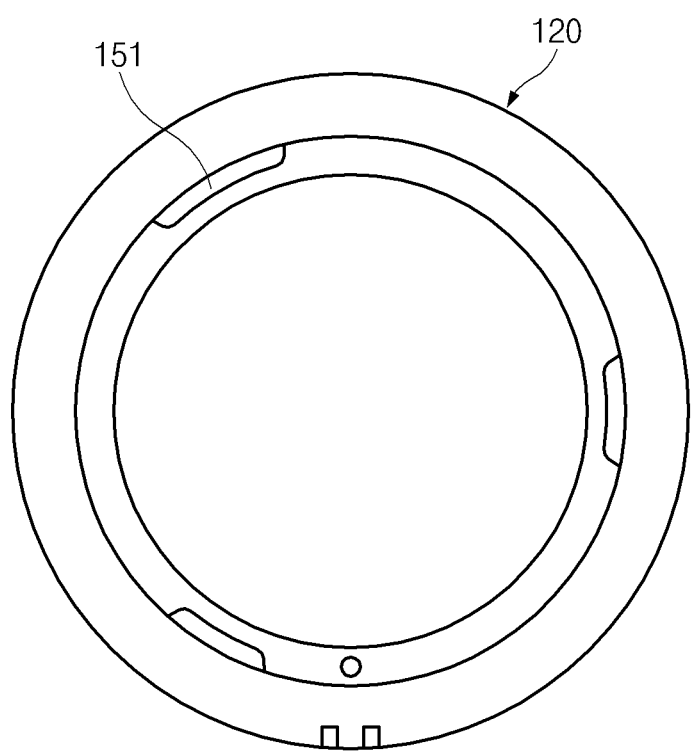
FIG. 5 is a plan view of a mount part according to various embodiments of the present disclosure.

FIG. 5 is a plan view of a mount part according to various embodiments of the present disclosure.

Figure 6:
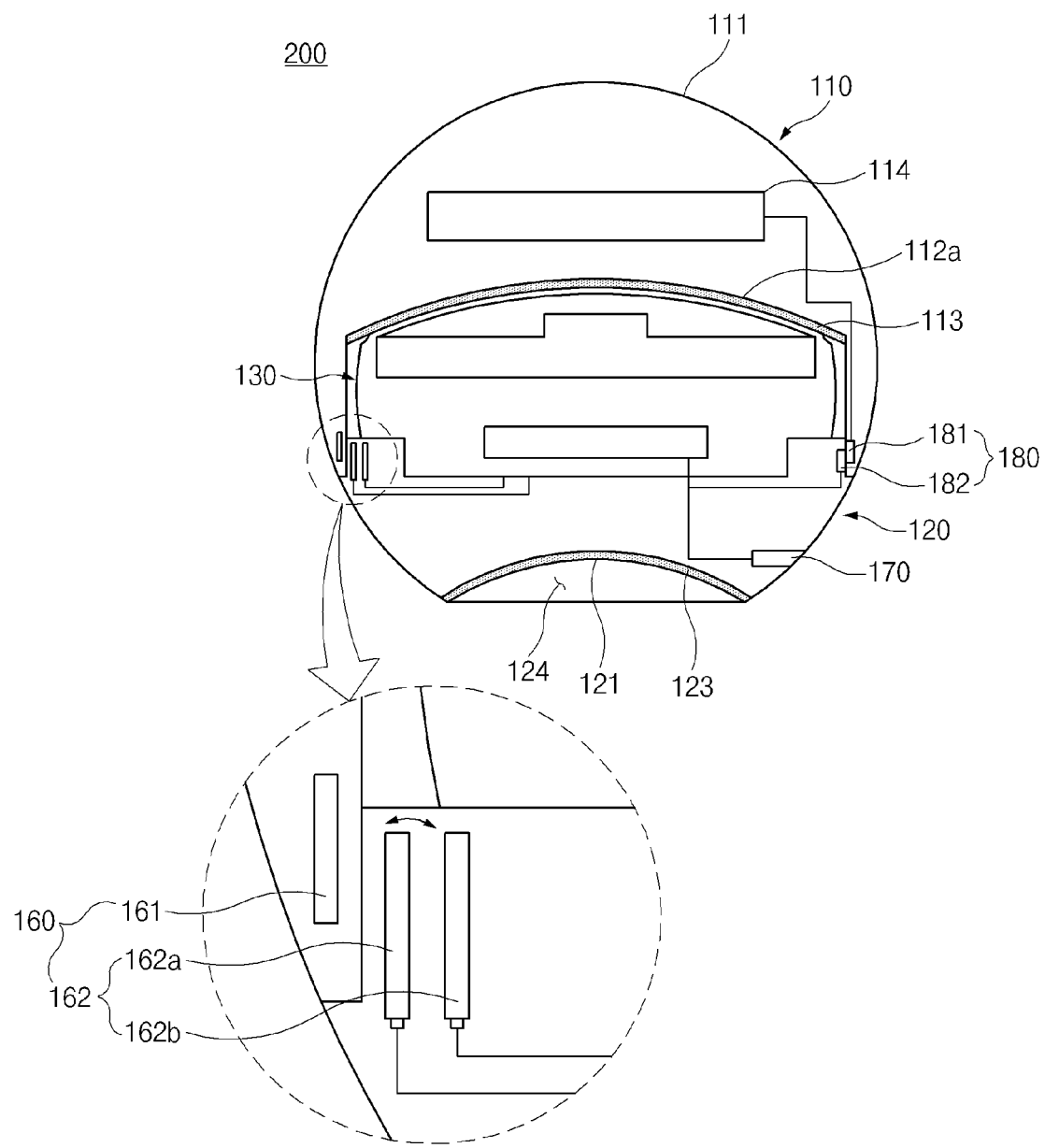
FIG. 6 is a sectional view of an electronic device according to various embodiments of the present disclosure.

FIG. 6 is a sectional view of an electronic device according to various embodiments of the present disclosure.

Referring to FIGS. 3 to 6, the portable electronic device 200 according to an embodiment of the present disclosure is configured to include an electronic device 130 having a camera function, a case part 110 having the inside recessed to form a hollow 112 opened to one side to allow the electronic device 130 to be inserted, and a mount part 120 with one side that is detachable from the case part 110 and having a top surface 122 where the electronic device 130 is coupled.

First, referring to FIGS. 4 and 5, according to an embodiment of the present disclosure, a lens type camera may correspond to the electronic device 130 and the electronic device 130 and the mount part 120 may be detachably coupled to each other so that the electronic device 130 may be coupled to the mount part 120.

According to an embodiment of the present disclosure, the mount part 120 may be coupled with the electronic device 130 through a coupling part 150. The coupling part 150 may include a first fin 151 protruding toward the inside of the mount part 120 and a groove may be disposed between the first fin 151 and the top surface 122 of the mount part 120. The coupling part 150 may include a second fin 152 protruding from the lower end of the electronic device 130 toward one side.

Therefore, the second fin 152 may be inserted into a groove disposed between the top surface 122 of the mount part 120 and the first fin 151 so that the electronic device 130 may be coupled to the mount part 120.

Referring to FIG. 4, according to an embodiment of the present disclosure, a hollow 112 formed in the case part 110 may have a space larger than the size of the electronic device 130 to allow the electronic device 130 to be inserted into the case part 110. According to an embodiment of the present disclosure, when the hollow 112 formed in the case part 110 is coupled with the mount part 120, it may be formed with a depth at which a top surface 131 of the electronic device 130 contacts the inner peripheral surface 112a of the case part 110 or a fine gap is formed therebetween.

Additionally, a protective layer 113 may be formed to prevent damage such as scratching of the top surface 131 of the electronic device 130 inserted into the inside of the case part 110.

The case part 110 and the mount part 120 may further include a switch 160 to allow the electronic device 130 to operate when the mount part 120 is separated from the case part 110.

The switch 160 according to various embodiments of the present disclosure may be provided to allow the electronic device 130 to change into a turn-on state or a turn-off state or allow the camera function of the electronic device 130 to be activated or deactivated according to a coupling state of the case part 110 and the mount part 120.

According to an embodiment of the present disclosure, the switch 160 may include a magnet switch and may include a first switch 161 formed of a magnetic material inside the case part 110 and a second switch 162 by which the electronic device 130 is turned off as disconnected by the magnetic property of the first switch 161 when the case part 110 is coupled to the mount part 120 and the electronic device 130 is turned on as connected when the case 110 is separated from the mount part 120. In more detail, the second switch 162 may include a first connection part 162a and a second connection part 162b that are respectively connected to contacts 125. The contacts 125 may be electrically connected to contacts 134 on a lower end surface 133 of the electronic device 130. As the case part 110 and the mount part 120 are brought into proximity, the first connection part 162a and the second connection part 162b are forced apart by a magnetic force. This forcing apart opens a circuit formed by contacts 125 and contacts 134, thus allowing the electronic device 130 to be activated or deactivated according to a coupling state of the case part 110 and the mount part 120. In an alternative embodiment, the first connection part 162a and the second connection part 162b may be forced together by a magnetic force that occurs when the case part 110 and the mount part 120 are brought into proximity.

According to various embodiments of the present disclosure, the portable electronic device 200 to which the case of the electronic device 130 is coupled may further include a first connection part 170 exposed to the outside of the mount part 120 and connected to the electronic device 130 through a charging line in order to supply external charging power as external power supply device is connected to an electronic device battery 132 built in to the electronic device 130 as soon as the electronic device 130 is coupled to the mount part 120.

Therefore, when the external power supply device is connected to the first connection part 170, the battery 132 of the electronic device 130 may be charged through the first connection part 170.

According to various embodiments of the present disclosure, the case part 110 may further include a case battery 114 therein and may further include a second connection part 180 including a first terminal 181 formed at the case part 110 and connected to the case battery 114 and a second terminal 182 formed at the mount part 120 and connected to the first connection part 170.

According to an embodiment of the present disclosure, the electronic device battery 132 may be connected to the second terminal 182 of the second connection part 180 through a charging line. Therefore, when the case part 110 and the mount part 120 are coupled to each other, the case battery 114 and the electronic device battery 132 may be connected to each other through the first terminal 181 and the second terminal 182 of the second connection part 180 instead of the first connection part 170.

Moreover, when the case battery 114 and the electronic device battery 132 are connected to each other, if a voltage of the case battery 114 is higher than a voltage of the electronic device battery 132, the electronic device battery 132 may be charged by receiving power from the case battery 114.

Therefore, even when there is no external power supply device, if the electronic device battery 132 is completely discharged or an amount of charge is small, the electronic device battery 132 may be charged by receiving power from the case battery 114 as the case part 110 and the mount part 120 are coupled to each other.

According to an embodiment of the present disclosure, the portable electronic device 200 may further include a third connection part 190 including a third terminal 191 disposed at the top surface 122 of the mount part 120 and connecting the electronic device 130 to at least one of the switch 160, the first connection part 170, and the second connection part 180 when the electronic device 130 is coupled to the mount part 120 and a fourth terminal 192 connected to the electronic device battery 132 and disposed at the lower end surface 133 of the electronic device 130.

Herein, when the electronic device 130 is coupled to the mounting part 120, as the third terminal 191 contacts the fourth terminal 192, the electronic device battery 132 may be connected to at least one of the first connection part 170 and the second connection part 180.

Moreover, referring to FIG. 6, the portable electronic device 200 according to another embodiment of the present disclosure may be formed of one integral body of the mount part 120 and the electronic device 130.

According to the above embodiment of the present disclosure, the electronic device 130 is detachably coupled to the mounting part 120 and the third terminal 191 and the fourth terminal 192 are connected at the third connection part 190 so that the electronic device 130 is connected to the mount part 120.

However, in the portable electronic device 200 according to another embodiment of the present disclosure, the mount part 120 and the electronic device 130 are formed in one body so that the electronic device battery 132 may be connected to the first connection part 170 and the second connection part 180 through a charging line in a form of not including the third connection part 190.

Hereinafter, a functional effect of the portable electronic device 200 according to an embodiment of the present disclosure will be described.

Referring to FIG. 3, in relation to the portable electronic device 200 according to an embodiment of the present disclosure, when the electronic device 130 is detachably coupled to the mount part 120 or integrally coupled to the mount part 120, the mount part 120 may be detachably coupled to the case part 110 in all cases.

Therefore, when a user carries or keeps the electronic device 130 without using it, as the mount part 120 having the electronic device 130 coupled thereto is coupled to the case part 110, the electronic device 130 is inserted and received into a hollow 112 formed in the case part 110.

For example, when the mount part 120 with the electronic device 130 mounted thereon is coupled to the case part 110, the hollow 112 formed inside the case part 110 may be formed to allow the electronic device 130 to be inserted thereto.

Therefore, when a user keeps or carries the electronic device 130, the electronic device 130 is prevented from being directly exposed to the outside so that damage of the electronic device 130 due to external environment may be avoided.

Additionally, the portable electronic device 200 according to an embodiment of the present disclosure includes the switch 160, so that when the case part 110 is separated from the mount part 120, the electronic device 130 may be turned on automatically or a camera function may be activated. When the case part 110 and the mount part 120 are coupled to each other, the electronic device 130 may be turned off automatically or a camera function may be deactivated.

Therefore, when the electronic device 130 is removed from the case part 110 by separating the case part 110 from the mount part 120 in order to use the electronic device 130, since it is unnecessary to operate the electronic device 130 by pressing an additional switch, a user can use the electronic device 130 more conveniently.

Additionally, when a user stores the electronic device 130 in the case part 110 to keep or carry it without using the electronic device 130, since the event in which a user unintentionally keeps or carries the electronic device 130 with power on is prevented, the battery built in to the electronic device 130 cannot be discharged.

Figure 7:
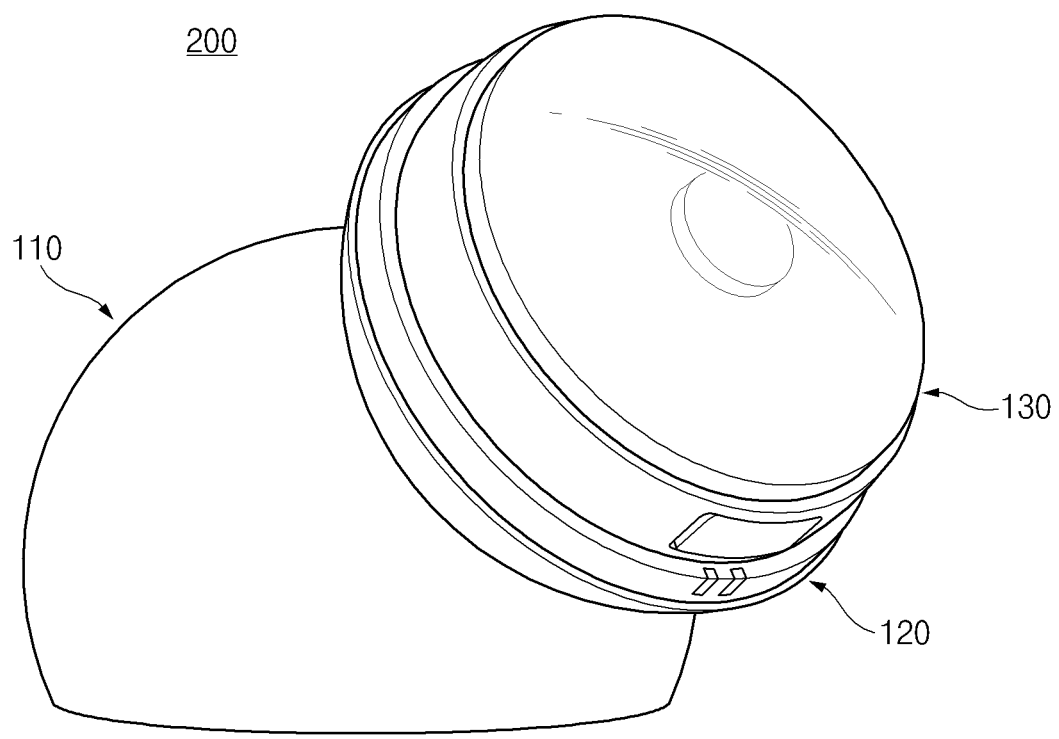
FIG. 7 is a perspective view when a mount part is attached to an outer peripheral surface of a case part after the mount part having an electronic device coupled thereto is separated from the case part according to various embodiments of the present disclosure.

FIG. 7 is a perspective view when a mount part is attached to an outer peripheral surface of a case part after the mount part having an electronic device coupled thereto is separated from the case part according to various embodiment of the present disclosure.

Figure 8:
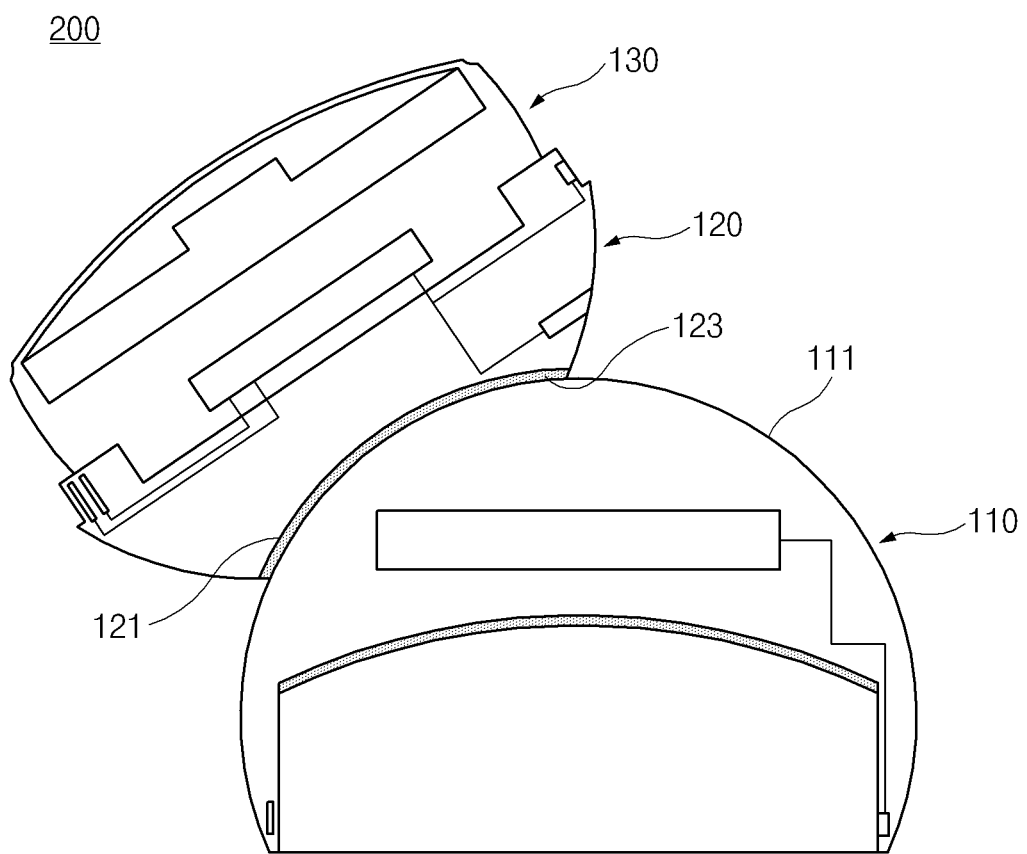
FIG. 8 is a sectional view when a mount part is attached to an outer peripheral surface of a case part after the mount part having an electronic device coupled thereto is separated from the case part according to various embodiments of the present disclosure.

FIG. 8 is a sectional view when a mount part is attached to an outer peripheral surface of a case part after the mount part having an electronic device coupled thereto is separated from the case part according to various embodiment of the present disclosure.

Referring to FIGS. 7 and 8, in relation to the portable electronic device 200 according to an embodiment of the present disclosure, a curved surface may be formed at the outside of the case part 110 and the recessed curved surface 121 may be formed at the lower part of the mount part 120 and a magnetic part may be formed at the case part 110 and the mount part 120.

Therefore, when the mount part 120 is separated from the case part 110 and the curved surface of the mount part 120 contacts the outer peripheral surface 111 of the case part 110, the mount part 120 may be disposed at the case part 110 in a contact state. The electronic device 130 mounted at the top surface 122 of the mount part 120 may be attached to the case part 110 and may stand without using an additional device such as a tripod.

Additionally, as the outer peripheral surface 111 of the case part 110 is formed with a curved surface, a user may freely set a direction that the top surface 131 of the electronic device 130 having a camera function faces by changing a position at which the mount part 120 contacts the case part 110.

For example, when the electronic device 130 is disposed to contact a lower end of the outer peripheral surface 111 of the case part 110, a camera lens disposed at the electronic device 130 may be disposed to face the front. When a user moves the position at which the electronic device 130 is disposed to contact the case part 110 from the bottom to the top, a camera lens disposed at the electronic device 1300 may move from the bottom to the top.

When a user rotates the position at which the electronic device 130 is disposed to contact the case part 110 in a horizontal direction on the basis of the center of a sphere, the direction of the camera lens also rotates in the horizontal direction so that it is set to face the position that the user wants.

Figure 9:
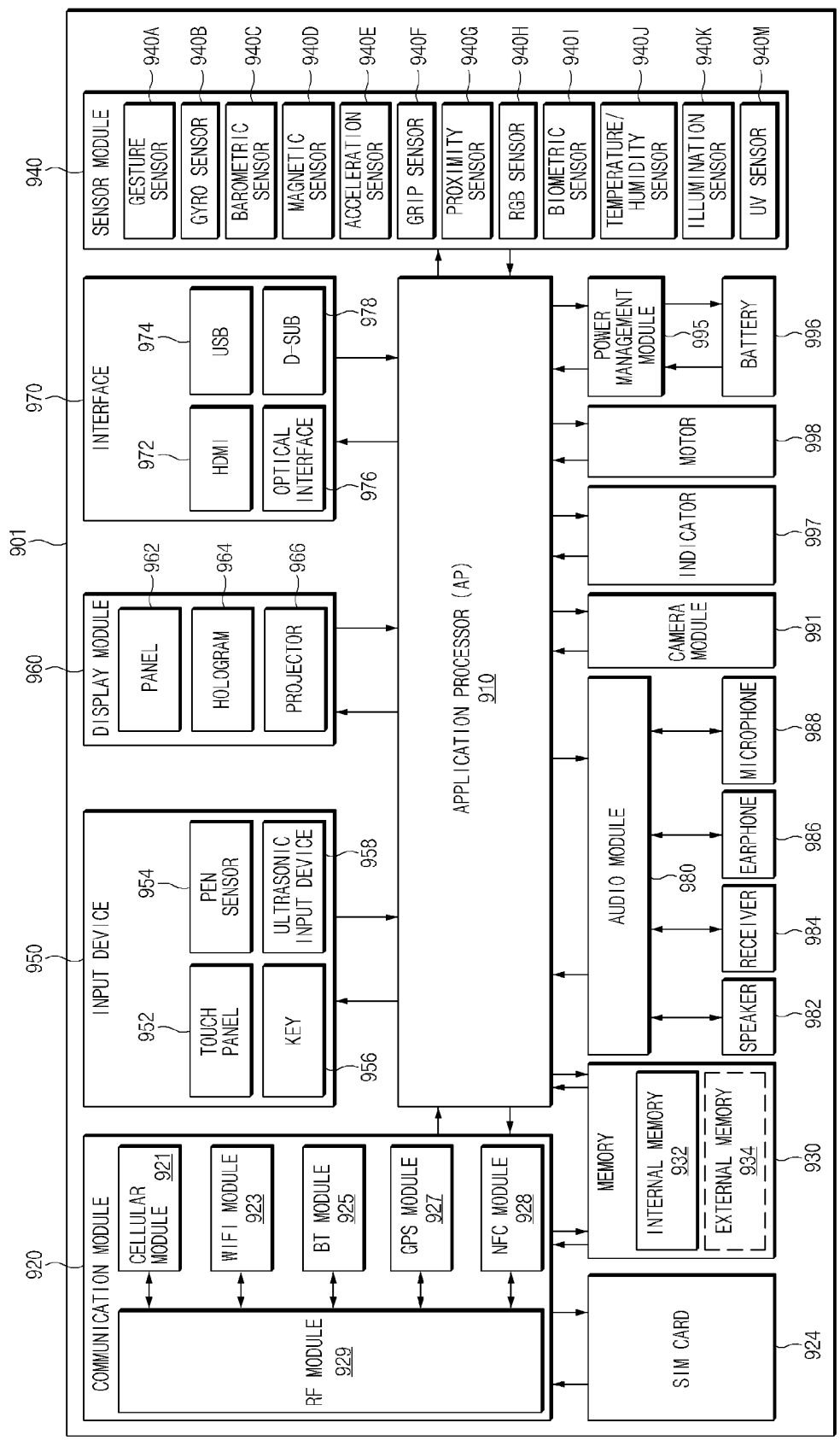
FIG. 9 is a block diagram of an electronic device according to various embodiments of the present disclosure.

FIG. 9 is a block diagram of an electronic device according to various embodiments of the present disclosure.

The electronic device of FIG. 9, may, for example, configure all or part of an electronic device according to the various embodiments of the present disclosure described so far.

Referring to FIG. 9, the electronic device 901 may include application processor (AP) 910, a communication module 920, a subscriber identification module (SIM) card 924, a memory 930, a sensor module 940, an input device 950, a display 960, an interface 970, an audio module 980, a camera module 991, a power management module 995, a battery 996, an indicator 997, and a motor 998.

The AP 910 may control a plurality of hardware or software components connected to the AP 910 and also may perform various data processing and operations with multimedia data by executing an operating system or an application program. The AP 910 may be implemented with a system on chip (SoC), for example. According to an embodiment of the present disclosure, the AP 910 may further include a graphic processing unit (GPU) (not shown).

The communication module 920 may perform data transmission/reception between the electronic device 901 and other electronic devices connected via network. According to an embodiment of the present disclosure, the communication module 920 may include a cellular module 921, a wireless fidelity (WiFi) module 923, a bluetooth (BT) module 925, a GPS module 927, a near field communication (NFC) module 928, and a radio frequency (RF) module 929.

The cellular module 921 may provide voice calls, video calls, text services, or internet services through a communication network (for example, long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The cellular module 921 may perform a distinction and authentication operation on an electronic device in a communication network by using a subscriber identification module (for example, the SIM card 924), for example. According to an embodiment of the present disclosure, the cellular module 921 may perform at least part of a function that the AP 910 provides. For example, the cellular module 921 may perform at least part of a multimedia control function.

According to an embodiment of the present disclosure, the cellular module 921 may further include a communication processor (CP). Additionally, the cellular module 921 may be implemented with an SoC, for example.

According to an embodiment of the present disclosure, the AP 910 or the cellular module 921 (for example, a CP) may load instructions or data, which are received from a nonvolatile memory or at least one of other components connected thereto, into a volatile memory and then may process them. Furthermore, the AP 910 or the cellular module 921 may store data received from or generated by at least one of other components in a nonvolatile memory.

Each of the WiFi module 923, the BT module 925, the GPS module 927, and the NFC module 928 may include a processor for processing data transmitted/received through a corresponding module.

According to an embodiment of the present disclosure, at least part (for example, at least one) of the WiFi module 923, the BT module 925, the GPS module 927, and the NFC module 928 may be included in one integrated chip (IC) or IC package. For example, at least some (for example, a CP corresponding to the cellular module 921 and a WiFi processor corresponding to the WiFi module 923) of processors respectively corresponding to the cellular module 925, the WiFi module 927, the BT module 928, the GPS module 921, and the NFC module 923 may be implemented with one SoC.

The RF module 929 may be responsible for data transmission/reception, for example, the transmission/reception of an RF signal. Although not shown in the drawings, the RF module 929 may include a transceiver, a power amplifier module (PAM), a frequency filter, or a low noise amplifier (LNA). Additionally, the RF module 929 may further include components for transmitting/receiving electromagnetic waves on a free space in a wireless communication, for example, conductors or conducting wires.

According to an embodiment of the present disclosure, at least one of the cellular module 921, the WiFi module 923, the BT module 925, the GPS module 927, and the NFC module 928 may perform RF signal transmission/reception.

The SIM card 924 may be a card including a subscriber identification module and may be inserted into a slot formed at a specific position of an electronic device. The SIM card 924 may include unique identification information (for example, an integrated circuit card identifier (ICCID)) or subscriber information (for example, an international mobile subscriber identity (IMSI)).

The memory 930 may include an internal memory 932 or an external memory 934. The internal memory 932 may include at least one of a volatile memory (for example, dynamic random-access memory (DRAM), static RAM (SRAM), and synchronous dynamic RAM (SDRAM)) and a non-volatile memory (for example, one time programmable read-only memory (OTPROM), programmable ROM (PROM), erasable and programmable ROM (EPROM), electrically erasable and programmable ROM (EEPROM), mask ROM, flash ROM, not and (NAND) flash memory, and not or (NOR) flash memory).

According to an embodiment of the present disclosure, the internal memory 932 may be a Solid State Drive (SSD). The external memory 934 may further include flash drive, for example, compact flash (CF), secure digital (SD), micro Micro-SD, Mini-SD, extreme digital (xD), or a memorystick. The external memory 934 may be functionally connected to the electronic device 901 through various interfaces. According to an embodiment of the present disclosure, the electronic device 901 may further include a storage device (or a storage medium) such as a hard drive.

The sensor module 940 measures physical quantities or detects an operating state of the electronic device 901, thereby converting the measured or detected information into electrical signals. The sensor module 940 may include at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (for example, a red, green, blue (RGB) sensor), a biometric sensor 940I, a temperature/humidity sensor 940J, an illumination sensor 940K, and an ultra violet (UV) sensor 940M. Additionally or alternatively, the sensor module 940 may include an E-nose sensor (not shown), an electromyography (EMG) sensor, an electroencephalogram (EEG) sensor (not shown), an electrocardiogram (ECG) sensor (not shown), an infra red (IR) sensor (not shown), an iris sensor (not shown), or a fingerprint sensor (not shown). The sensor module 940 may further include a control circuit for controlling at least one sensor therein.

The input device 950 may include a touch panel 952, a (digital) pen sensor 954, a key 956, or an ultrasonic input device 958. The touch panel 952 may recognize a touch input through at least one of capacitive, resistive, infrared, or ultrasonic methods, for example. Additionally, the touch panel 952 may further include a control circuit. In the case of the capacitive method, both direct touch and proximity recognition are possible. The touch panel 952 may further include a tactile layer. In this case, the touch panel 952 may provide a tactile response to a user.

The (digital) pen sensor 954 may be implemented through a method similar or identical to that of receiving a user's touch input or an additional sheet for recognition. The key 956 may include a physical button, an optical key, or a keypad, for example. The ultrasonic input device 958, as a device checking data by detecting sound waves through a microphone (for example, a microphone 988) in the electronic device 901, may provide wireless recognition through an input tool generating ultrasonic signals. According to an embodiment of the present disclosure, the electronic device 901 may receive a user input from an external device (for example, a computer or a server) connected to the electronic device 901 through the communication module 920.

The display 960 may include a panel 964, a hologram device 966, or a projector 966. The panel 962 may include a liquid-crystal display (LCD) or an active-matrix organic light-emitting diode (AM-OLED). The panel 962 may be implemented to be flexible, transparent, or wearable, for example. The panel 962 and the touch panel 952 may be configured with one module. The hologram 964 may show three-dimensional images in the air by using the interference of light. The projector 966 may display an image by projecting light on a screen. The screen, for example, may be placed inside or outside the electronic device 901. According to an embodiment of the present disclosure, the display 960 may further include a control circuit for controlling the panel 962, the hologram device 964, or the projector 966.

The interface 970 may include a high-definition multimedia interface (HDMI) 972, a USB 974, an optical interface 976, or a D-subminiature (sub) 978, for example. The interface 970 may include a mobile high-definition link (MHL) interface, a SD card/multi-media card (MMC) interface, or an infrared data association (IrDA) standard interface.

The audio module 980 may convert sound into electrical signals and convert electrical signals into sounds. The audio module 980 may process sound information inputted/outputted through a speaker 982, a receiver 984, an earphone 986, or the microphone 988.

The camera module 991, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 995 may manage the power of the electronic device 901. Although not shown in the drawings, the power management module 995 may include a power management IC (PMIC), a charger IC, or a battery or fuel gauge, for example.

The PMIC may be built in an IC or SoC semiconductor, for example. A charging method may be classified into a wired method and a wireless method. The charger IC may charge a battery and may prevent overvoltage or overcurrent flow from a charger. According to an embodiment of the present disclosure, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge may measure the remaining capacity of the battery 996, or a voltage, current, or temperature of the battery 996, such as during charging. The battery 996 may store or generate electricity and may supply power to the electronic device 901 by using the stored or generated electricity. The battery 996, for example, may include a rechargeable battery or a solar battery.

The indicator 997 may display a specific state of the electronic device 901 or part thereof (for example, the AP 910), for example, a booting state, a message state, or a charging state. The motor 998 may convert electrical signals into mechanical vibration. Although not shown in the drawings, the electronic device 901 may include a processing device (for example, a GPU) for mobile TV support. A processing device for mobile TV support may process media data according to the standards such as digital multimedia broadcasting (DMB), digital video broadcasting (DVB), or media flow.

According to various embodiments of the present disclosure, as an electronic device is received inside a case, the risk of damage on a camera can be avoided while carrying and the camera can be carried more easily.

According to various embodiments of the present disclosure, as a mount having an electronic device mounted thereon is separated from a case, the electronic device's power is turned on automatically and as the mount is coupled to the case, the electronic device's power is turned off automatically, so that a camera power can be turned on/off conveniently.

According to various embodiments of the present disclosure, the outer peripheral surface of a case is formed with a curved surface, and a direction of a mount where an electronic device attached to the outer peripheral surface of the case is mounted can be set freely.

According to various embodiments of the present disclosure, as a battery is provided inside a case separately from a battery provided in an electronic device, it can be used as a backup power.

Each of the above-mentioned components of the electronic device according to various embodiments of the present disclosure may be configured with at least one component and the name of a corresponding component may vary according to the kind of an electronic device. An electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FP- GAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor executes an instruction, it may perform a function corresponding to the instruction. At least part of a programming module may include a module, a program, a routine, sets of instructions, or a process to perform at least one function, for example.

The computer-readable storage media may include Magnetic Media such as a hard disk, a floppy disk, and a magnetic tape, Optical Media such as Compact Disc ROM (CD-ROM) and Digital Versatile Disc (DVD), Magneto-Optical Media such as Floptical Disk, and a hardware device especially configured to store and perform a program instruction (for example, a programming module) such as ROM, RAM, and flash memory. Additionally, a program instruction may include high-level language code executable by a computer using an interpreter in addition to machine code created by a complier. The hardware device may be configured to operate as at least one software module to perform an operation of various embodiments and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device carrying case comprising:
   a case part having an internal recess that forms a hollow opened to one side and a curved external peripheral surface; and
   a mount part having an upper part provided to be detachable from a lower end of the case part and a lower part with an inwardly recessed curved surface.

2. The case of claim 1, wherein the case part and the mount part each comprises a magnet part, wherein as the recessed curved surface of the mount part contacts the curved external peripheral surface of the case part, the mount part contacts the case part by magnetic force.

3. The case of claim 2, wherein the case part and the mount part are screw-coupled to each other.

4. The case of claim 2, wherein the curved external peripheral surface of the case part has a spherical form.

5. The case of claim 2, further comprising a switch having a contact state that is changed according to a coupling state of the case part and the mount part.

6. The case of claim 5, wherein the switch comprises:
   a first sub-switch formed of a magnetic material and located in the case part; and
   a second sub-switch configured to disconnect by a magnetic property of the first sub-switch when the case part is coupled to the mount part and to connect when the case part is separated from the mount part.

7. The case of claim 2, wherein the mount part further comprises a first connection part exposed to the outside to receive external charging power.

8. The case of claim 7, further comprising:
   a case battery located within the case part; and
   a second connection part including a first terminal located at the case part and connected to the case battery and a second terminal located at the mount part and connected to the first connection part,
   wherein, when the mount part is coupled to the case part, the first terminal and the second terminal connect the case battery and the first connection part.

9. The case of claim 8, further comprising a third connection part including a third terminal connected to at least one of the second switch, the first connection part, and the second connection part and externally exposed at a top surface of the mount part.

10. A portable electronic device comprising:
    an electronic device having a camera function; and
    an electronic device carrying case including a case part having an internal recess that forms a hollow opened to one side to allow the electronic device to be inserted and a mount part having one side configured to be detachable from the case part and including the electronic device mounted on a top surface.

11. The device of claim 10, wherein the internal recess of the case part has a space larger than a size of the electronic device so as to allow the electronic device to be inserted to an inside of the case part.

12. The device of claim 11, wherein the internal recess of the case part has a depth at which the top surface of the electronic device contacts the inner peripheral surface of the case part or a depth at which the top surface of the electronic device is separated from the inner peripheral surface of the case part by a fine gap when the case part is coupled with the mount part.

13. The device of claim 10, further comprising a switch at the case part and the mount part to allow a state of the electronic device to be changed or to allow the camera function to be activated or deactivated according to a coupling state of the case part and the mount part.

14. The device of claim 13, wherein the switch comprises:
    a first sub-switch formed of a magnetic material and located inside the case part; and
    a sub-second switch configured to disconnect by a magnetic property of the first sub-switch to turn off the electronic device when the case part is coupled to the mount part and to connect to turn off the second switch when the case part is separated from the mount part.

15. The device of claim 10, wherein the case part and the mount part each comprises a magnetic part for maintaining a state in which the mount part contacts the case part when the mount part contacts a curved external peripheral surface of the case part.

16. The device of claim 15, wherein an inwardly recessed curved surface is formed at a rear part of the mount part to adhere to the curved external peripheral surface of the case part.

17. The device of claim 10, wherein the mount part further comprises a first connection part, configured to electrically connect to a battery of the electronic device, mounted at the mount part and exposed to the outside of the mount part to receive external charging power.

18. The device of claim 17, wherein the case part further comprises:
- a case battery; and
- a second connection part including a first terminal located at the case part and connected to the case battery and a second terminal located at the mount part and connected to the first connection part,
- wherein as the first terminal and the second terminal are electrically connected when the mount part is coupled to the case part, the case battery and the first connection part are electrically connected.

19. The device of claim 18, wherein the electronic device battery is connected to the second terminal.

20. The device of claim 18, further comprising:
- a third connection part including a third terminal disposed at an upper part of the mount part; and
- a fourth terminal connected to the electronic device battery and disposed at a lower end of the electronic device,
- wherein as the electronic device is coupled to the mount part, the third terminal and the fourth terminal are connected thereby connecting the electronic device battery to at least one of the second switch, the first connection part, and the second connection part.

* * * * *